US011838923B2

(12) United States Patent
Shapin et al.

(10) Patent No.: US 11,838,923 B2
(45) **Date of Patent: *Dec. 5, 2023**

(54) PRE-EMPTION INDICATION MESSAGE

(71) Applicant: Telefonaktiebolaget LM Ericsson (publ), Stockholm (SE)

(72) Inventors: Alexey Shapin, Luleå (SE); Robert Baldemair, Solna (SE); Daniel Larsson, Lund (SE); Stefan Parkvall, Bromma (SE); Gustav Wikström, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,292

(22) Filed: Mar. 7, 2022

(65) Prior Publication Data

US 2022/0191914 A1 Jun. 16, 2022

Related U.S. Application Data

(63) Continuation of application No. 15/769,657, filed as application No. PCT/SE2018/050053 on Jan. 24, 2018, now Pat. No. 11,297,639.

(60) Provisional application No. 62/521,197, filed on Jun. 16, 2017.

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1812* (2013.01); *H04L 5/0007* (2013.01);
(Continued)

(58) Field of Classification Search
CPC ......... H04W 72/1289; H04W 28/0278; H04W 72/042; H04W 72/0446; H04W 28/14;
(Continued)

(56) References Cited

U.S. PATENT DOCUMENTS 11,297,639 B2 * 4/2022 Shapin .................. H04L 47/245
2017/0311337 A1 10/2017 Mo
(Continued)

FOREIGN PATENT DOCUMENTS

WO 2015131730 9/2015

OTHER PUBLICATIONS

3GPP TSG-RAN WG2 NR Ad Hoc; Spokane, USA; Source: Ericsson; Title: Overview of URLLC (Tdoc R2-1700393) Jan. 17-19, 2017.

(Continued)

*Primary Examiner* — Justin T Van Roie
(74) *Attorney, Agent, or Firm* — BAKER BOTTS L.L.P.

(57) ABSTRACT

According to certain embodiments, a method is disclosed for use in a wireless device being affected by pre-emption. The method comprises receiving information from a network node and performing one or more operations based on the received information. The information indicates a portion of a buffer that is affected by pre-emption. Examples of operations that can be performed based on the received information include flushing the portion of the buffer affected by pre-emption or separately handling the portion of the buffer affected by pre-emption.

24 Claims, 13 Drawing Sheets

(51) Int. Cl.
*H04L 5/00* (2006.01)
*H04W 28/02* (2009.01)
*H04W 72/0446* (2023.01)

(52) U.S. Cl.
CPC ....... *H04L 5/0055* (2013.01); *H04W 28/0278* (2013.01); *H04W 72/0446* (2013.01)

(58) Field of Classification Search
CPC ............. H04W 72/1273; H04L 1/1812; H04L 5/0007; H04L 5/0055; H04L 47/30; H04L 47/245
See application file for complete search history.

(56) References Cited

U.S. PATENT DOCUMENTS

| | | | |
|---|---|---|---|
| 2018/0262311 | A1 | 9/2018 | Wang |
| 2018/0278368 | A1 | 9/2018 | Kim |
| 2018/0367263 | A1 | 12/2018 | Ying |

OTHER PUBLICATIONS

3GPP TSG RAN #89, Hangzhou, China; Source: Ericsson; Title: Semi-persistent scheduling for NB-IoT (R 1-1706889 May 15-19, 2017.

EPO Communication Pursuant to Article 94(3) EPC issued for Application No. 18 704 091.0-1215, 10 pages, dated Jul. 18, 2019.

3GPP TSG RAN WG1 Meeting #88bis; R1-1704922; Spokane, USA, Agenda Item: 8.1.3.3.5; Source LG Electronics; Title: Discussion on indication method for impacted resources for downlink, 9 pages, Apr. 3-7, 2017.

PCT International Search Report for International Application No. PCT/SE2018/050053—dated Apr. 13, 2018.

PCT Written Opinion of the International Searching Authority for International Application No. PCT/SE2018/050053—dated Apr. 13, 2018.

3GPP TSG RAN WG1 Meeting #89; Hangzhou, P.R. China; Agenda Item 7.1.3.3.6; Source: LG Electronics; Title: Discussion on pre-empltion indication design; R1-1707664—May 15-19, 2017.

3GPP TSG RAN WG1 Meeting #89; Hangzhou, P.R. China; Agenda Item 7.1.3.3.6; Source: Huawei, HiSilicon; Title: on pre emption indication for DL Multiplexing of URLLC and eMBB; R1-1708124—May 15-19, 2017.

3GPP TSG RAN WG1 Meeting #89; Hangzhou, P.R. China; Agenda Item 7.1.3.3.6; Source: Qualcomm Incorporated; Title: DL Indication channel design principle for URLLC/eMBB dynamic multiplexing; R1-1708637—May 15-19, 2017.

3GPP TSG RAN WG1 Meeting #89; Hangzhou, P.R. China; Agenda Item 7.1.3.3.6; Source: Ericcson; Title: On Pre-Empted Transmissions for Downlink; R1-1709111—May 15-19, 2017.

EPO Communication Pursuant to Article 94(3) EPC issued for Application No. 20152769.4-1215, 9 pages, dated Feb. 14, 2022.

* cited by examiner

PRE-EMPTION INDICATION MESSAGE

PRIORITY

This application is a continuation, under 35 U.S.C. § 120, of U.S. patent application Ser. No. 15/769,657 filed on Apr. 19, 2018, now U.S. Pat. No. 11,297,639, which is a U.S. National Stage Filing under 35 U.S.C. § 371 of International Patent Application Serial No. PCT/SE2018/050053 filed Jan. 24, 2018, and entitled "PRE-EMPTION INDICATION MESSAGE" which claims priority to U.S. Provisional Patent Application No. 62/521,197 filed Jun. 16, 2017, each of which are hereby incorporated by reference in their entirety.

TECHNICAL FIELD

The present disclosure relates, in general, to wireless communications and, more particularly, to pre-emption indication messages.

BACKGROUND

Dynamic multiplexing of different services is highly desirable for efficient use of system resources and maximizing its capacity. In downlink (DL), the assignment of resources can be instantaneous and is only limited by the scheduler implementation. Once low-latency data appears in a buffer, a base station should choose the earliest moment of time when resources could be normally allocated. This may, for example, be either the beginning of the subframe or a mini-slot where the mini-slot can start at any Orthogonal Frequency-Division Multiplexing (OFDM) symbol.

The stringent latency budget of traffic such as Ultra Reliable Low Latency Communication (URLLC), however, may require transmission of mini-slot signal without waiting for vacant resources. Thus, the user equipment (UE) may need to handle puncturing/pre-emption of slot data transmission. That is, cases when slot transmissions to UE1 on already allocated resources were overridden by mini-slot transmission to UE2. This may cause a negative impact in terms of mini-slot transmitter interference on slot receivers. Dynamic resource sharing between slot and mini-slot transmissions in the uplink (UL) is also desirable, and may involve puncturing/pre-emption of slot by mini-slot transmissions.

In the context of this disclosure, the terms "puncturing" and "pre-emption" have the same meaning so both terms are used interchangeably for description herein. In the latest Third Generation Partnership Project (3GPP) discussions, however, the focus is moving to the term "pre-emption."

FIG. 1 illustrates an example resource allocation procedure. A buffer (block 1) collects packets of slot data and reports about data presence to a Scheduler (block 7). Packets in the buffer (block 1) are waiting for a scheduling command which triggers channel coding, Hybrid Automatic Repeat Request (HARQ) cyclic buffer forming and modulation procedures (block 3). The Scheduler (block 7) makes a decision about time-frequency ranges of modulated slot data and provides this information to block 5, which is responsible for forming a time-frequency grid which consist of modulation symbols. In practice, block 5 is able to aggregate inputs from more than one source and an upper limit is defined by various factors.

In the process of forming the time-frequency grid, a mini-slot data can arrive in the buffer (block 2). Due to strict latency requirements for mini-slot data, the Scheduler (block 7) may decide to replace part of the slot modulation symbols by mini-slot modulation symbols. To do this, the Scheduler (block 7) triggers mini-slot channel coding, HARQ buffering, modulation, etc., by sending a command to block 4. It also sends updated grid mapping information to block 5. Simultaneously with that, the Scheduler (block 7) forms a special message with pre-emption information.

The prepared time-frequency grid is transferred to block 6 for OFDM modulation and further signal processing. Then, a radio signal is transmitted by block 8 to the antenna.

The Scheduler (block 7) could be a logical part of a transmitting node (e.g., a base station) or it could be located outside of a transmitting node (e.g., user equipment). In the first case, signaling data between blocks is delivered internally inside a node. The second case utilizes external signaling links between the scheduler and transmitting node.

HARQ retransmissions with incremental redundancy use a few different redundancy versions (RV) that are used for subsequent retransmissions.

3GPP has agreed on sending a multi-bit HARQ feedback, where each bit corresponds to an Acknowledgement (ACK)/Negative Acknowledgement (NACK) for a code block group (CBG). The size of a CBG ranges from a single code block (CB) to the whole transport block (TB). A CBG may be part of mini-slot or slot data.

SUMMARY

According to a first set of embodiments, a method is disclosed for use in a wireless device being affected by pre-emption. The method comprises receiving information from a network node and performing one or more operations based on the received information. The information indicates a portion of a buffer that is affected by pre-emption. In certain embodiments, the operation(s) comprise flushing the portion of the buffer affected by pre-emption. In certain embodiments, the operation(s) comprise separately handling the portion of the buffer affected by pre-emption.

According to a second set of embodiments, a computer program product comprises a non-transitory computer readable storage medium having computer readable program code embodied in the medium that, when executed by processing circuitry of a wireless device causes the wireless device to receive information from a network node and perform one or more operations based on the received information. The information indicates a portion of a buffer that is affected by pre-emption. In certain embodiments, the operation(s) comprise flushing the portion of the buffer affected by pre-emption. In certain embodiments, the operation(s) comprise separately handling the portion of the buffer affected by pre-emption.

According to a third set of embodiments, a wireless device comprises an interface and processing circuitry. The interface is configured to receive information from a network node and the processing circuitry is configured to perform one or more operations based on the received information. The information indicates a portion of a buffer that is affected by pre-emption. In certain embodiments, the operation(s) comprise flushing the portion of the buffer affected by pre-emption. In certain embodiments, the operation(s) comprise separately handling the portion of the buffer affected by pre-emption.

According to a fourth set of embodiments, a method is disclosed for use in a network node affected by pre-emption. The method comprises determining that a wireless device has been affected by pre-emption and sending information to the wireless device that indicates a portion of a buffer that is affected by the pre-emption.

According to a fifth set of embodiments, a computer program product comprises a non-transitory computer readable storage medium having computer readable program code embodied in the medium that, when executed by processing circuitry of a network node causes the network node to determine that a wireless device has been affected by pre-emption and send information to the wireless device that indicates a portion of a buffer that is affected by the pre-emption.

According to a sixth set of embodiments, a network node comprises processing circuitry and an interface. The processing circuitry is configured to determine that a wireless device has been affected by pre-emption. The interface is configured to send information to the wireless device that indicates a portion of a buffer that is affected by the pre-emption.

In certain embodiments, any method, computer program product, wireless device, and/or network node summarized in the first through sixth sets of embodiments above may also include one or more of the following features:

- The information indicating the portion of the buffer that is affected by pre-emption is communicated in Downlink Control Information (DCI) from the network node.
- The information indicating the portion of the buffer that is affected by pre-emption comprises a bitfield. Each bit indicates whether a corresponding Orthogonal Frequency-Division Multiplexing (OFDM) symbol has been pre-empted. In certain embodiments, the bit field consists of 14 bits.
- The information indicating the portion of the buffer that is affected by pre-emption indicates one or more transmission reception points (TRPs) affected by pre-emption.
- The information indicating the portion of the buffer that is affected by pre-emption indicates one or more carriers affected by pre-emption.
- The information indicating the portion of the buffer that is affected by pre-emption indicates one or more frequency resources affected by pre-emption.
- The information indicating the portion of the buffer that is affected by pre-emption indicates one or more time domain resources affected by pre-emption.
- The information indicating the portion of the buffer that is affected by pre-emption is configured by Radio Resource Control (RRC).
- The pre-emption overrides an allocation of resources for a transmission to the wireless device such that the resources are re-allocated for a transmission to another wireless device.
- The information indicating the portion of the buffer that is affected by pre-emption indicates a subframe or slot number when pre-emption took place.
- The information indicating the portion of the buffer that is affected by pre-emption comprises a time pointer that points backwards in time from when the information indicating the portion of the buffer is received.
- The information indicating the portion of the buffer that is affected by pre-emption indicates a hybrid automatic repeat request (HARQ) process number/identifier that was affected by pre-emption.
- The information indicating the portion of the buffer that is affected by pre-emption comprises a redundancy version of a HARQ retransmission affected by pre-emption.
- The information indicating the portion of the buffer that is affected by pre-emption comprises an acknowledgement/negative-acknowledgement resource indicator (ARI) and transmit power control (TPC) for physical uplink control channel (PUCCH).

According to another example embodiment, a method in a network node is disclosed. The method comprises determining that one or more wireless devices have been affected by pre-emption. The method comprises sending, to the one or more wireless devices, a pre-emption information message comprising information associated with the pre-emption. In certain embodiments, one or more of the following may apply:

- the pre-emption affects a slot transmission from the network node to the wireless device;
- the one or more wireless devices may be affected by pre-emption;
- the pre-emption information message may be comprised in downlink control information (DCI);
- the pre-emption information message may be wireless device specific;
- the information associated with the pre-emption may comprise information indicating one or more pre-empted physical resources;
- the information associated with the pre-emption may comprise information that identifies a pre-empted region of a soft buffer;
- the information associated with the pre-emption may comprise one or more of:
  - Subframe/slot number, when pre-emption took place;
  - Time pointer, such as a time pointer that points backwards in time from when the pre-emption DCI is received;
  - HARQ process number/ID, which was affected by pre-emption;
  - Carrier indicator and TRP indicator;
  - A time domain indication for the slot that is pre-empted, in which the affected OFDM symbols are indicated;
  - Frequency domain resource, where pre-emption took place;
  - Redundancy Version (RV); and
  - ARI indicator and TPC for Physical Uplink Control Channel (PUCCH).
- the pre-emption information message may comprise a bitfield that indicates backward in time which slot was pre-empted;
  - the bitfield may have 3 bits with the values (0, −1, −2, −3, −4, −5, −6, −7);
- the pre-emption information message may comprise a bitfield that indicates which OFDM symbols were pre-empted in an affected slot;
  - the bitfield may have 14 bits, and each bit may indicate the correspondingly pre-empted OFDM symbol; and
- the pre-emption information message may reuse a DCI payload size that the wireless device is monitoring for one or more other purposes.

According to another example embodiment, a network node is disclosed. The network node comprises processing circuitry. The processing circuitry is configured to determine that one or more wireless devices have been affected by pre-emption. The processing circuitry is configured to send, to the one or more wireless devices, a pre-emption information message comprising information associated with the pre-emption.

According to another example embodiment, a method in a wireless device is disclosed. The method comprises receiving, from a network node, a pre-emption information message comprising information associated with pre-emption. The method comprises performing one or more operations based on the received information associated with the pre-emption. In certain embodiments, one or more of the following may apply:

- the pre-emption may affect a slot transmission from the network node to the wireless device;
- the wireless device may be affected by pre-emption;
- the pre-emption information message may be comprised DCI;
- performing one or more operations based on the received information associated with the pre-emption may comprise one or more of:
  - determining a corrupted or preempted region of a soft buffer based on the received information associated with the pre-emption;
  - separately handling a portion of a soft buffer based on the received information associated with the pre-emption; and
  - flushing a portion of a soft buffer based on the received information associated with the pre-emption;
- the pre-emption information message may be specific to the wireless device;
- the information associated with the pre-emption may comprise information indicating one or more pre-empted physical resources;
- the information associated with the pre-emption may comprise information that identifies a pre-empted region of a soft buffer;
- the information associated with the pre-emption may comprise one or more of:
  - Subframe/slot number, when pre-emption took place;
  - Time pointer, such as a time pointer that points backwards in time from when the pre-emption DCI is received;
  - HARQ process number/ID, which was affected by pre-emption;
  - Carrier indicator and TRP indicator;
  - A time domain indication for the slot that is pre-empted, in which the affected OFDM symbols are indicated;
  - Frequency domain resource, where pre-emption took place;
  - RV; and
  - ARI indicator and TPC for PUCCH;
- the pre-emption information message may comprise a bitfield that indicates backward in time which slot was pre-empted;
  - the bitfield may have 3 bits with the values (0, −1, −2, −3, −4, −5, −6, −7);
- the pre-emption information message may comprise a bitfield that indicates which OFDM symbols were pre-empted in an affected slot;
  - the bitfield may have 14 bits, and each bit may indicate the correspondingly pre-empted OFDM symbol; and
- the pre-emption information message may reuse a DCI payload size that the wireless device is monitoring for one or more other purposes.

According to another example embodiment, a wireless device is disclosed. The wireless device comprises processing circuitry. The processing circuitry is configured to receive, from a network node, a pre-emption information message comprising information associated with pre-emption. The processing circuitry is configured to perform one or more operations based on the received information associated with the pre-emption.

Certain embodiments of the present disclosure may provide one or more technical advantages. As one example, certain embodiments may make it possible to send sufficient information to a wireless device about which part of the soft-buffer should be handled separately or flushed in case of slot transmission pre-emption. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

When slot transmission is pre-empted, the pre-empted part of the original message pollutes the soft buffer and should be flushed to give good performance. It is assumed that the specification would allow for an indication of the pre-emption by explicit signaling, which is carried by special signaling message. The message would in this case indicate that the previous transmission was fully or partially pre-empted. Despite agreement about the special signaling message, the content of this message is under discussion. The present disclosure contemplates various embodiments to efficiently indicate to the receiver which part of the soft buffer must be handled separately. Certain embodiments disclose content of the signaling message that is dedicated for pre-emption indication. Various sets of information are proposed that could be included in the signaling message for pre-emption indication to efficiently indicate pre-empted physical resources of slot transmission.

According to one example embodiment, a method in a network node is disclosed. The network node determines that one or more wireless devices have been affected by pre-emption. For example, a wireless device may be affected by pre-emption when transmission to the wireless device is cleared or partly/fully replaced by another transmission or by transmission to another wireless device(s) or by any other wireless signal. The network node sends, to the one or more wireless devices, a pre-emption information message comprising information associated with the pre-emption.

According to another example embodiment, a method in a wireless device is disclosed. The wireless device receives, from a network node, a pre-emption information message comprising information associated with pre-emption. The wireless device performs one or more operations based on the received information associated with the pre-emption.

Certain embodiments of the present disclosure may provide one or more technical advantages. As one example, certain embodiments may make it possible to send sufficient information to a UE about which part of the soft-buffer should be handled separately or flushed in case of slot transmission pre-emption. Other advantages may be readily apparent to one having skill in the art. Certain embodiments may have none, some, or all of the recited advantages.

Figure 2:
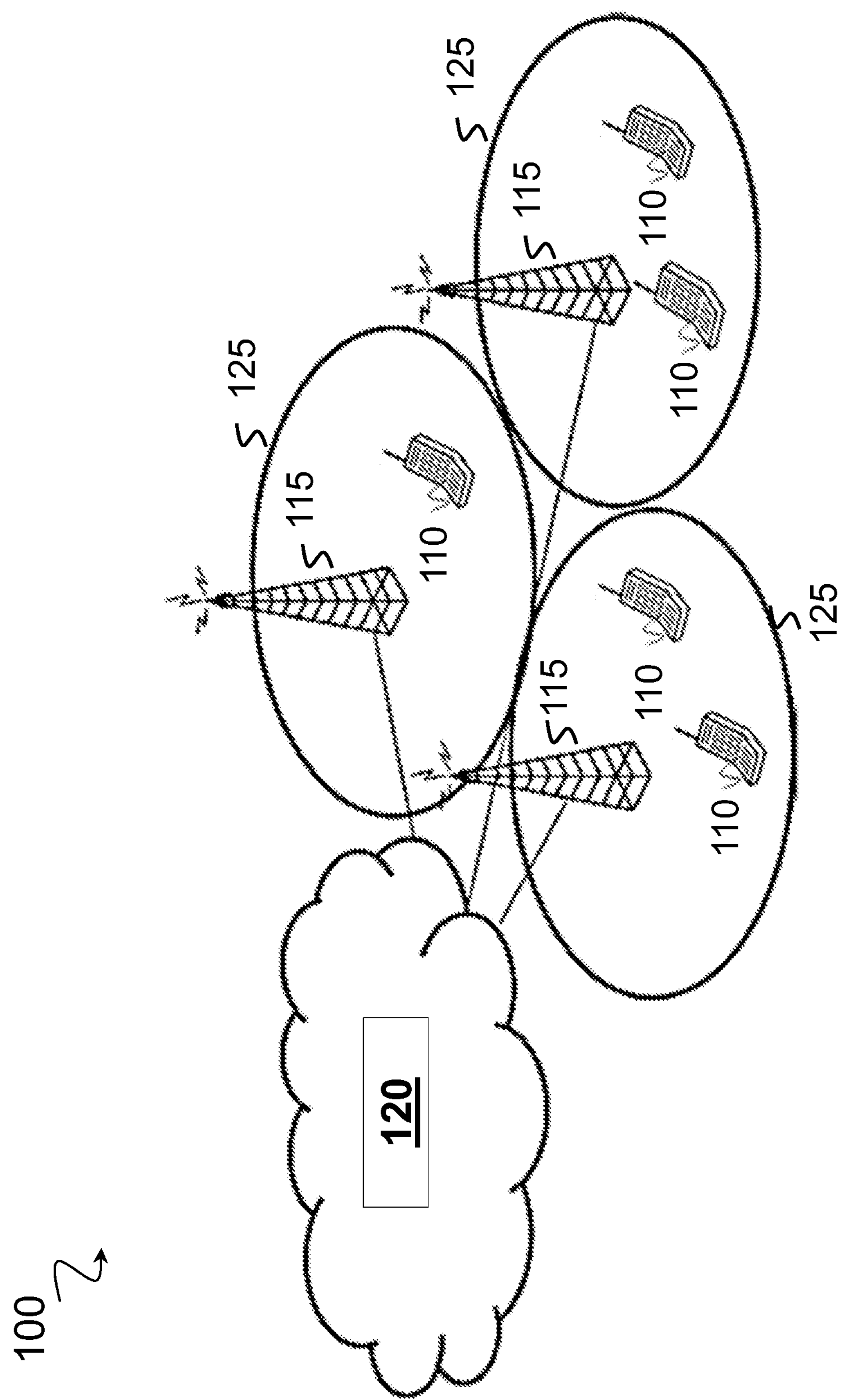
FIG. 2 is a block diagram illustrating an embodiment of a network, in accordance with certain embodiments.

FIG. 2 is a block diagram illustrating an embodiment of a network 100, in accordance with certain embodiments. Network 100 includes one or more UE(s) 110 (which may be interchangeably referred to as wireless devices 110) and one or more network node(s) 115. UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology "network node" is used. It can be any kind of network node, which may comprise a base station (BS), radio base station, Node B, multi-standard radio (MSR) radio node such as MSR BS, evolved Node B (eNB), gNB, network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and does in particular not imply a certain hierarchical relation between the two; in general, "network node" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 5-9.

Although FIG. 2 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to LTE, LTE-Advanced, 5G, Narrowband Internet-of-Things (NB-IoT), New Radio (NR), UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the DL, the present disclosure contemplates that the various embodiments are equally applicable in the UL.

As described above, when slot transmission is pre-empted, the pre-empted part of the original message pollutes the soft buffer and should be flushed to give good performance. It is assumed that the specification would allow for an indication of the pre-emption by explicit signaling, which is carried by special signaling message. The message would in this case indicate that the previous transmission was fully or partially pre-empted. Despite agreement about the special signaling message, the content of this message is under discussion. The present disclosure contemplates various embodiments to efficiently indicate to the receiver which part of the soft buffer must be handled separately. More particularly, certain embodiments disclose content of the signaling message that is dedicated for pre-emption indication. Various sets of information are proposed that could be included in the signaling message to efficiently indicate pre-empted physical resources of slot transmission.

Figure 1:
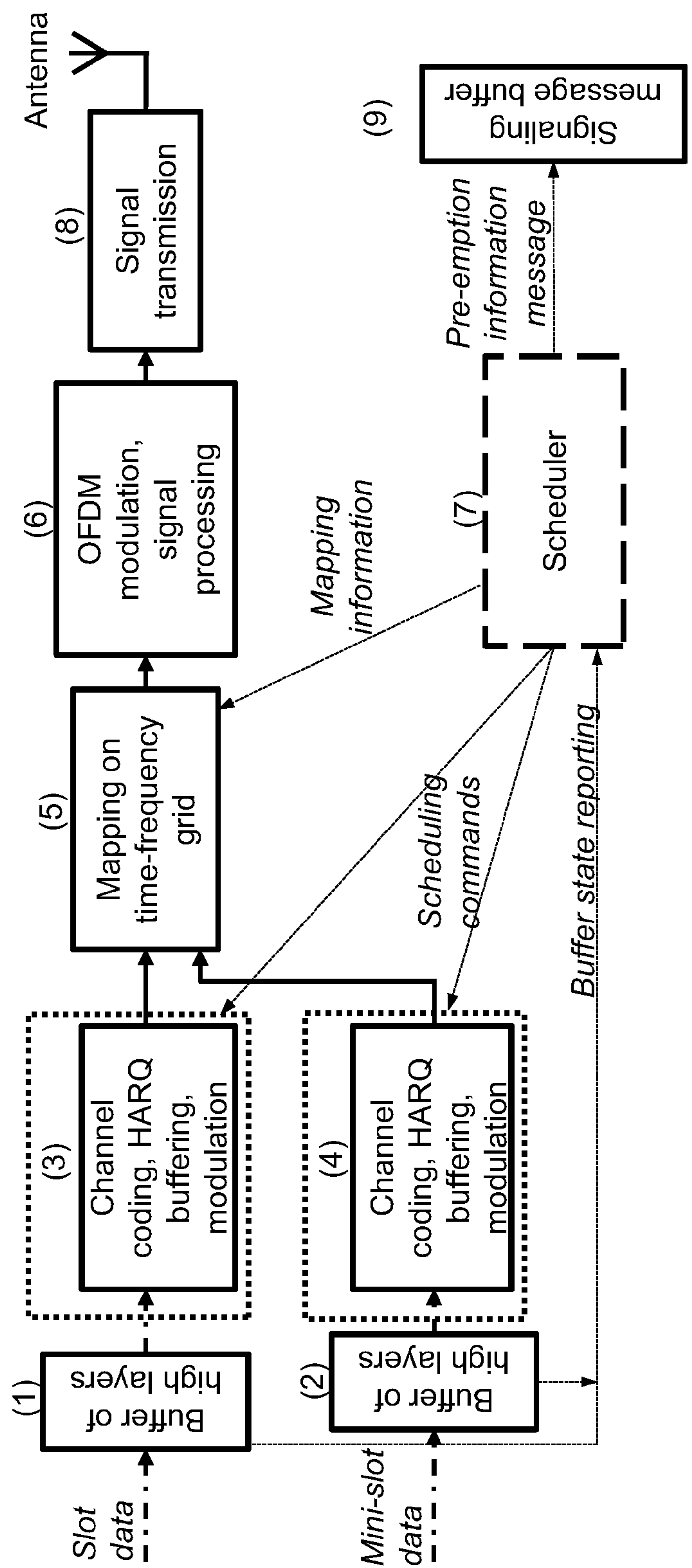
FIG. 1 illustrates an example resource allocation procedure.

An example of the resource allocation procedure was described above in relation to FIG. 1. As described above, in the process of forming the time-frequency grid a mini-slot data can arrive in the buffer. Due to strict latency requirements for mini-slot data, the Scheduler may decide to replace part of the slot modulation symbols by mini-slot modulation symbols. Along with triggering mini-slot channel coding, HARQ buffering, modulation, etc. and sending updated grid mapping information, the Scheduler forms a special message with pre-emption information. The various embodiments described herein relate to a content of pre-emption information message which can be sent to a device affected by pre-emption.

In certain embodiments, information can be included in the message to precisely point on a corrupted (pre-empted) region of soft-buffer. For example, in certain embodiments the information included in the message may be one or more of:

- Subframe/slot number, when pre-emption took place;
- Time pointer, such as a time pointer that points backwards in time from when the pre-emption downlink control information (DCI) is received;
- HARQ process number/ID, which was affected by pre-emption;
- Carrier indicator and TRP indicator;
- A time domain indication for the slot that is pre-empted, in which the affected OFDM symbols are indicated;
- Frequency domain resource, where pre-emption took place;
- Redundancy Version (RV); and
- ARI indicator and TPC for Physical Uplink Control Channel (PUCCH).

In some cases, a subset of the information above may be given in the pre-emption DCI and not all information is strictly needed.

In certain embodiments, the applicable subframe/slot number wherein the pre-emption occurred in can be given directly as number. As one example, it could be a bitfield that indicates directly the related slot/subframe. In such a scenario, the UE would able to derive this backwards in time which was the affected slot/subframe. As another example, it could be a time point that points backwards in time a given number of slots/subframes from the point wherein the pre-emption DCI is received. This bit field can be, for example, 4 bits and the values could be 1, 2, 3, 4 slots backwards in time (the value 0 can also be provided if the indicator is provided in the same slot). An alternative or complement to this is to indicate the affected HARQ process or HARQ processes that were pre-empted if there were multiple HARQ processes.

Furthermore, it is possible to indicate in the pre-emption DCI which carrier and/or TRP that the pre-emption occurred in by one or more field(s) that indicate this. This could be a joint or a separate field.

In certain embodiments, the time domain bit field can be indicated by one or more of the following examples:

- A 14 bit mask pattern to support single/double/triple etc. puncturing cases. A bit position related to OFDM symbol number and a bit value indicate whether OFDM-symbol was affected by pre-emption or not.
- An 8 bits pattern, which is structured as: 4 bits for indication of the first OFDM-symbol number in pre-emption region and 4 bits for indication total number of OFDM-symbols pre-empted.
- A 7 bits pattern, which can be applicable if the system has a limit of pre-emption duration up to 7(8) OFDM-symbols. Then the pattern is structured as: 4 bits for indication of the first OFDM-symbol number in pre-emption region and 3 bits for indication total number of OFDM-symbols pre-empted.
- A 5-6 bits pattern also can be applicable if the system has pre-defined pre-emption durations. Then the pattern is structured as: 4 bits for indication of the first OFDM-symbol number in pre-emption region.
    - In cases of up to two pre-emption duration can take place (2 OFDM symbols or 7 OFDM symbols), one bit can indicate total number of OFDM-symbols pre-empted.
    - In cases of up to four pre-emption duration can take place, two bits can indicate total number of OFDM-symbols pre-empted.
- A bit pattern wherein the time domain allocation that can be pre-empted are configured by Radio Resource Control (RRC), for example the bit field can be 3 bits (more or less is also possible). However, each specific value indicates which the corresponding pre-empted time domain resources are, they could be both contiguous in time but also non-contiguous time. This could then match the potential scheduling patterns, for example by a gNB.
- A code block pattern, with a length following the number of code blocks used in the original transmission affected by pre-emption. The pattern would indicate entire code blocks that should be flushed in the UE buffer.

If no frequency domain allocation is provided, the UE can assume that the whole OFDM symbols are pre-empted. In this case, UE can consider CB/CBG decoding results or use blind detection techniques to localize pre-emption more precisely. It is however also possible to provide a frequency domain allocation that is pre-empted. This could be common for all time domain resources or separate for all time domain resources. A potential example is to use the resource allocation field in frequency (resource block assignment field) to provide the pre-empted frequency resources. Another embodiment is to use a lower number of bits to allocate n-divisions of the frequency resource. As an example, with 4 bits, quarters of the used frequency resource in the original transmission can be indicated.

In certain embodiments, RV information can be omitted from the message and the UE can simply assume that the last received RV was pre-empted.

In certain embodiments, further HARQ feedback related information can be provided to the UE. This may include, for example, information such as where the UE should send its HARQ bits on PUCCH by an ARI and the applicable power control commands for PUCCH.

The DL pre-emption message may, in certain embodiments, use a DCI payload size that is used for many different purposes to save blind decodes. The UE may identify the pre-emption DCI based on that it is scrambled with specific DCI Radio Network Temporary Identifier (RNTI). This RNTI can be received by a single or multiple UEs. An alternative is that some bit combination in the DCI message that is used to schedule the UE with Physical Downlink Shared Channel (PDSCH) is used to identify the pre-emption DCI. This could for example be the frequency resource allocation field that this is set to 0.

Figure 3:
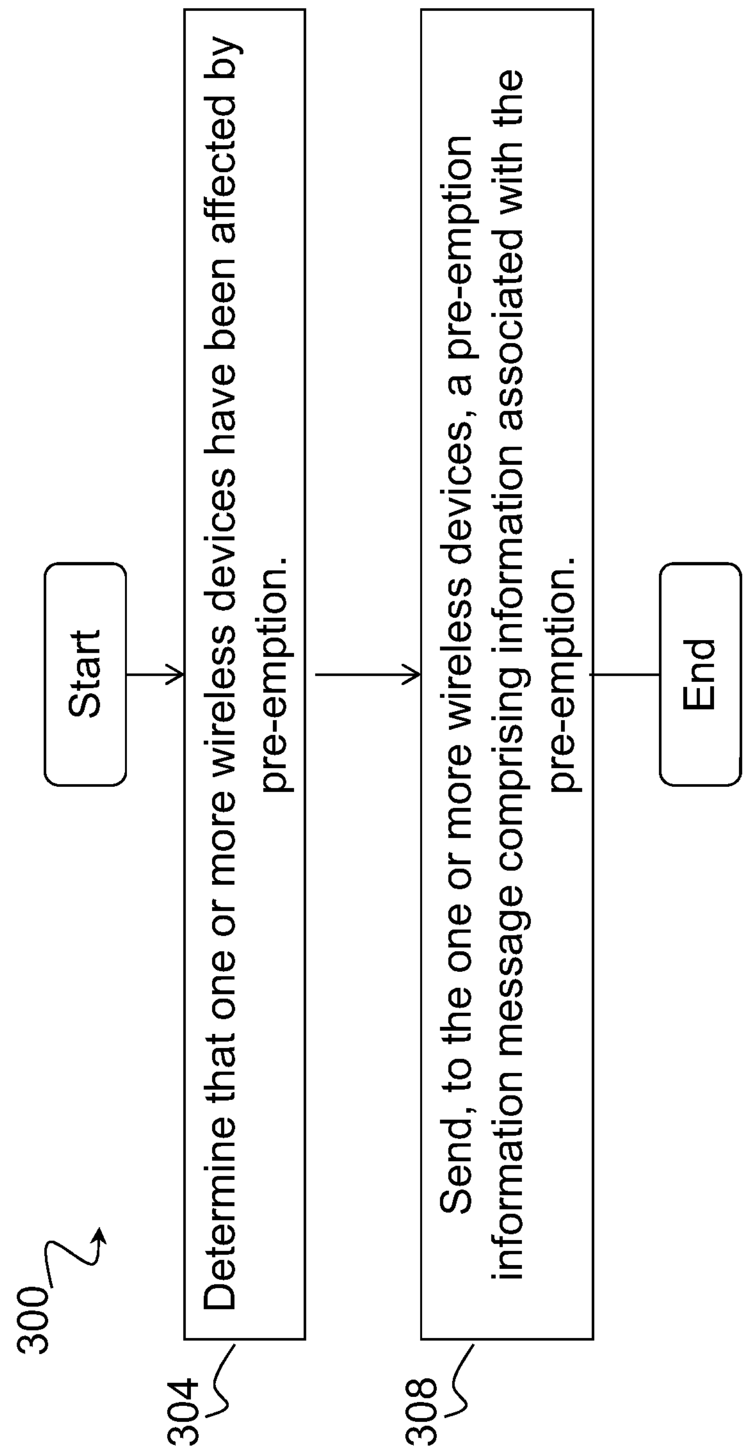
FIG. 3 is a flow diagram of a method in a network node, in accordance with certain embodiments.

FIG. 3 is a flow diagram of a method 300 in a network node, in accordance with certain embodiments. Method 300 begins at step 304, where the network node determines that a wireless device has been affected by pre-emption. In certain embodiments, the pre-emption may affect a slot transmission from the network node to the wireless device.

At step 308, the network node sends, to one or more wireless devices, a pre-emption information message comprising information associated with the pre-emption. In certain embodiments, the one or more wireless devices may be affected by pre-emption. The pre-emption information message may be comprised in DCI. In certain embodiments, the pre-emption information message may be wireless device specific.

In certain embodiments, the information associated with the pre-emption may comprise information indicating one or more pre-empted physical resources. In certain embodiments, the information associated with the pre-emption may comprise information that identifies a pre-empted region of a soft buffer. In certain embodiments, the information associated with the pre-emption may comprise one or more of: a subframe/slot number when pre-emption took place; a time pointer, such as a time pointer that points backwards in time from when the pre-emption DCI is received; a HARQ process number/ID, which was affected by pre-emption; a carrier indicator and TRP indicator; a time domain indication for the slot that is pre-empted in which the affected OFDM symbols are indicated; a frequency domain resource where pre-emption took place; an RV; and an ARI indicator and TPC for PUCCH.

In certain embodiments, the pre-emption information message may comprise a bitfield that indicates backward in time which slot was pre-empted. In such a scenario, the bitfield may have 3 bits with the values (0, −1, −2, −3, −4, −5, −6, −7). In certain embodiments, the pre-emption information message may comprise a bitfield that indicates which OFDM symbols were pre-empted in an affected slot. In such a scenario, the bitfield may have 14 bits, and each bit may indicate the correspondingly pre-empted OFDM symbol. In certain embodiments, the pre-emption information message may reuse a DCI payload size that the wireless device is monitoring for one or more other purposes.

Figure 4:
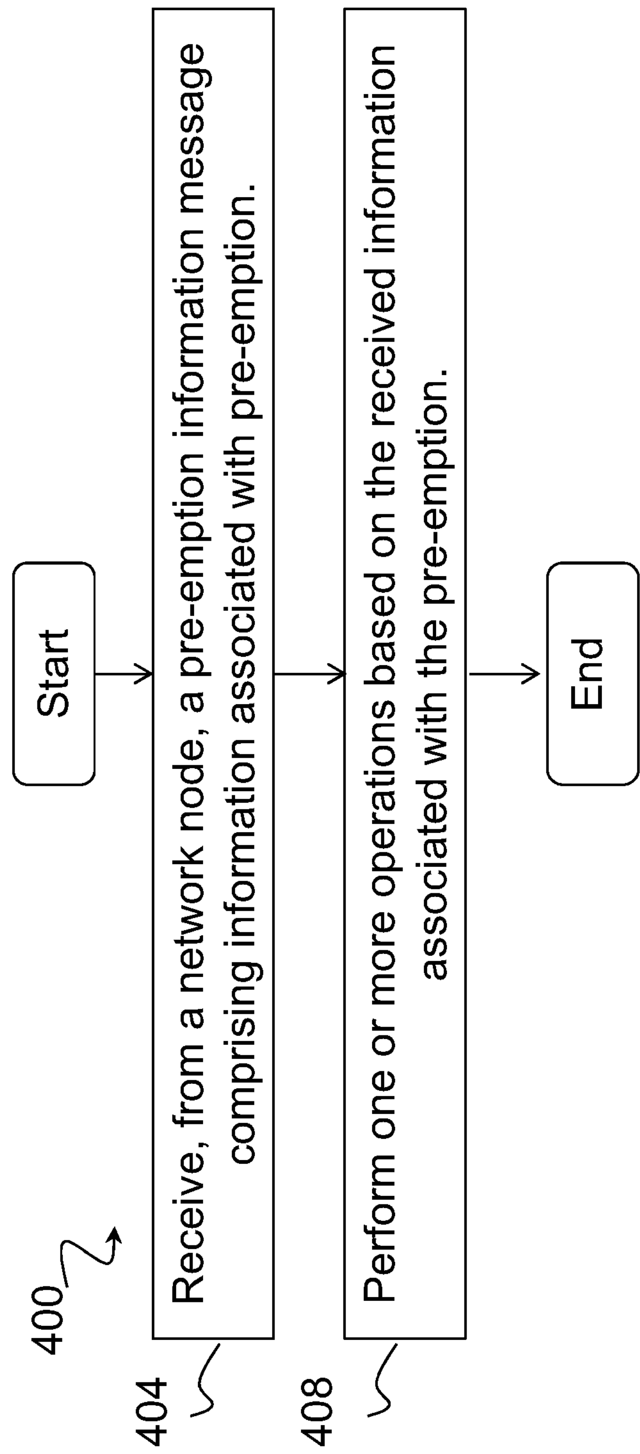
FIG. 4 is a flow diagram of a method in a wireless device, in accordance with certain embodiments.

FIG. 4 is a flow diagram of a method 400 in a wireless device, in accordance with certain embodiments. Method 400 begins at step 404, where the wireless device receives, from a network node, a pre-emption information message comprising information associated with pre-emption. In certain embodiments, the pre-emption may affect a slot transmission. The wireless device may be affected by pre-emption. In certain embodiments, the pre-emption information message may be comprised in DCI. In certain embodiments, the pre-emption information message may be specific to the wireless device.

At step 408, the wireless device performs one or more operations based on the received information associated with the pre-emption. In certain embodiments, performing one or more operations based on the received information associated with the pre-emption may comprise one or more of: determining a corrupted or preempted region of a soft buffer based on the received information associated with the pre-emption; separately handling a portion of a soft buffer based on the received information associated with the pre-emption; and flushing a portion of a soft buffer based on the received information associated with the pre-emption. In certain embodiments, the information associated with the pre-emption may comprise information indicating one or more pre-empted physical resources. In certain embodiments, the information associated with the pre-emption may comprise information that identifies a pre-empted region of a soft buffer. In certain embodiments, the information associated with the pre-emption may comprise one or more of: a subframe/slot number when pre-emption took place; a time pointer, such as a time pointer that points backwards in time from when the pre-emption DCI is received; a HARQ process number/ID, which was affected by pre-emption; a carrier indicator and TRP indicator; a time domain indication for the slot that is pre-empted in which the affected OFDM symbols are indicated; a frequency domain resource where pre-emption took place; an RV; and an ARI indicator and TPC for PUCCH.

In certain embodiments, the pre-emption information message may comprise a bitfield that indicates backward in time which slot was pre-empted. In such a scenario, the bitfield may have 3 bits with the values (0, −1, −2, −3, −4, −5, −6, −7). In certain embodiments, the pre-emption information message may comprise a bitfield that indicates which OFDM symbols were pre-empted in an affected slot. In such a scenario, the bitfield may have 14 bits, and each bit may indicate the correspondingly pre-empted OFDM symbol. In certain embodiments, the pre-emption information message may reuse a DCI payload size that the wireless device is monitoring for one or more other purposes.

Figure 5:
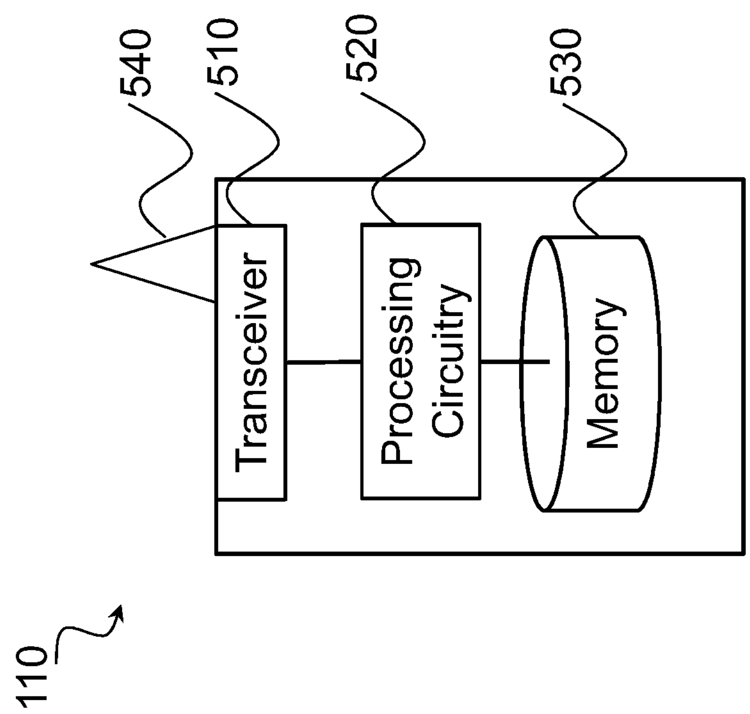
FIG. 5 is a block schematic of an exemplary wireless device, in accordance with certain embodiments.

FIG. 5 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 510, processing circuitry 520, and memory 530. In some embodiments, transceiver 510 facilitates transmitting wireless signals to and receiving wireless signals from network node 115 (e.g., via antenna 540), processing circuitry 520 executes instructions to provide some or all of the functionality described herein as being provided by wireless device 110, and memory 530 stores the instructions executed by processing circuitry 520.

Processing circuitry 520 may include any suitable combination of hardware and software implemented in one or more modules to execute instructions and manipulate data to perform some or all of the described functions of wireless device 110, such as the functions of wireless device 110 described in relation to any of FIGS. 1-4 and/or 10-13. In some embodiments, processing circuitry 520 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 530 is generally operable to store instructions, such as a computer program, software, an application including one or more of logic, rules, algorithms, code, tables, etc. and/or other instructions capable of being executed by processing circuitry 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 520.

Other embodiments of wireless device 110 may include additional components beyond those shown in FIG. 5 that may be responsible for providing certain aspects of the wireless device's functionality, including any of the functionality described herein and/or any additional functionality (including any functionality necessary to support the solution described herein). As just one example, wireless device 110 may include input devices and circuits, output devices, and one or more synchronization units or circuits, which may be part of the processing circuitry 520. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 6:
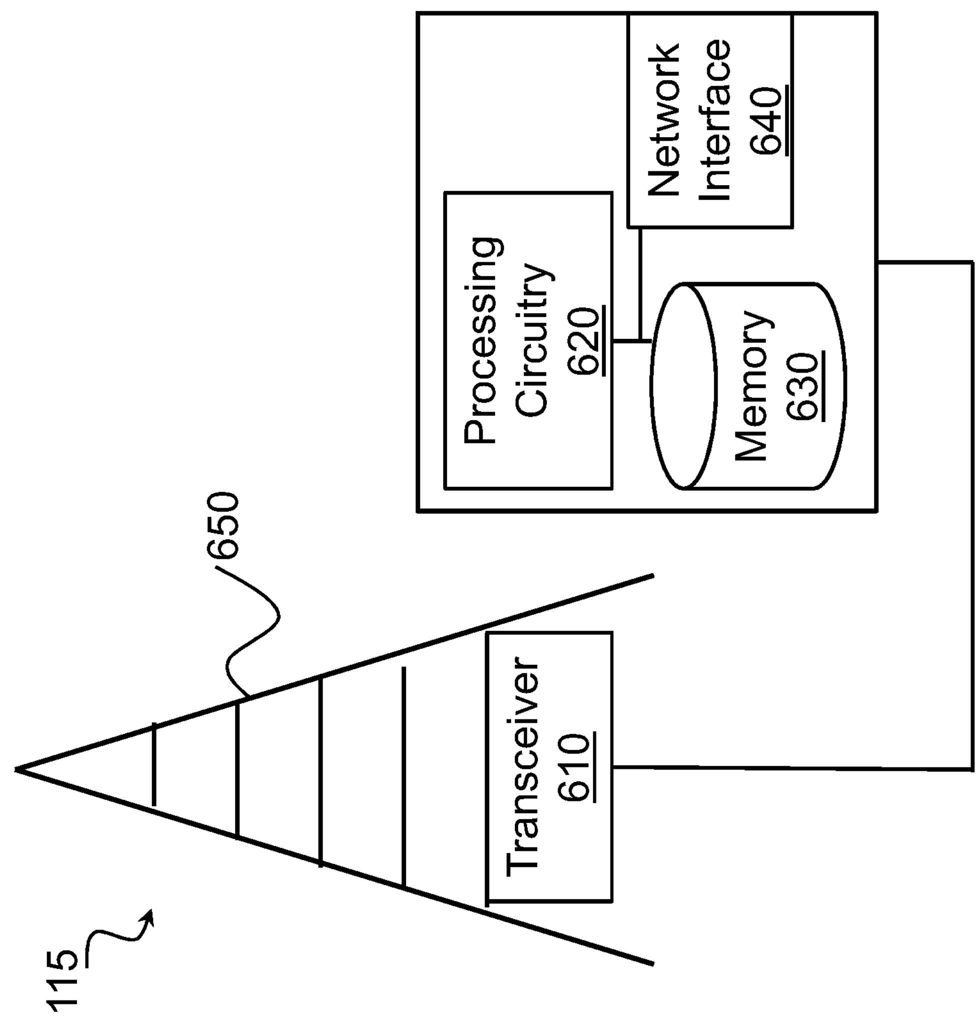
FIG. 6 is a block schematic of an exemplary network node, in accordance with certain embodiments.

FIG. 6 is a block schematic of an exemplary network node 115, in accordance with certain embodiments. Network node 115 may be any type of radio network node or any network node that communicates with a UE and/or with another network node. Examples of network node 115 include an eNodeB, a gNB, a node B, a base station, a wireless access point (e.g., a Wi-Fi access point), a low power node, a base transceiver station (BTS), relay, donor node controlling relay, transmission points, transmission nodes, remote radio unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 610, processing circuitry 620, memory 630, and network interface 640. In some embodiments, transceiver 610 facilitates transmitting wireless signals to and receiving wireless signals from wireless device 110 (e.g., via antenna 650), processing circuitry 620 executes instructions to provide some or all of the functionality described herein as being provided by a network node 115, memory 630 stores the instructions executed by processing circuitry 620, and network interface 640 communicates signals to backend network components, such as a gateway, switch, router, Internet, Public Switched Telephone Network (PSTN), core network nodes or radio network controllers 130, etc.

Processing circuitry 620 may include any suitable combination of hardware and software implemented in one or more modules to execute instructions and manipulate data to perform some or all of the described functions of network node 115, such as those described in relation to any of FIGS. 1-4 and/or 10-13. In some embodiments, processing circuitry 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by processing circuitry 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processing circuitry 620 and may refer to any suitable device operable to receive input for network node 115, send output from network node 115, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of network node 115 may include additional components beyond those shown in FIG. 6 that may be responsible for providing certain aspects of the radio network node's functionality, including any of the functionality described herein and/or any additional functionality (including any functionality necessary to support the solutions described herein). The various different types of network nodes may include components having the same physical hardware but configured (e.g., via programming) to support different radio access technologies, or may represent partly or entirely different physical components.

Figure 7:
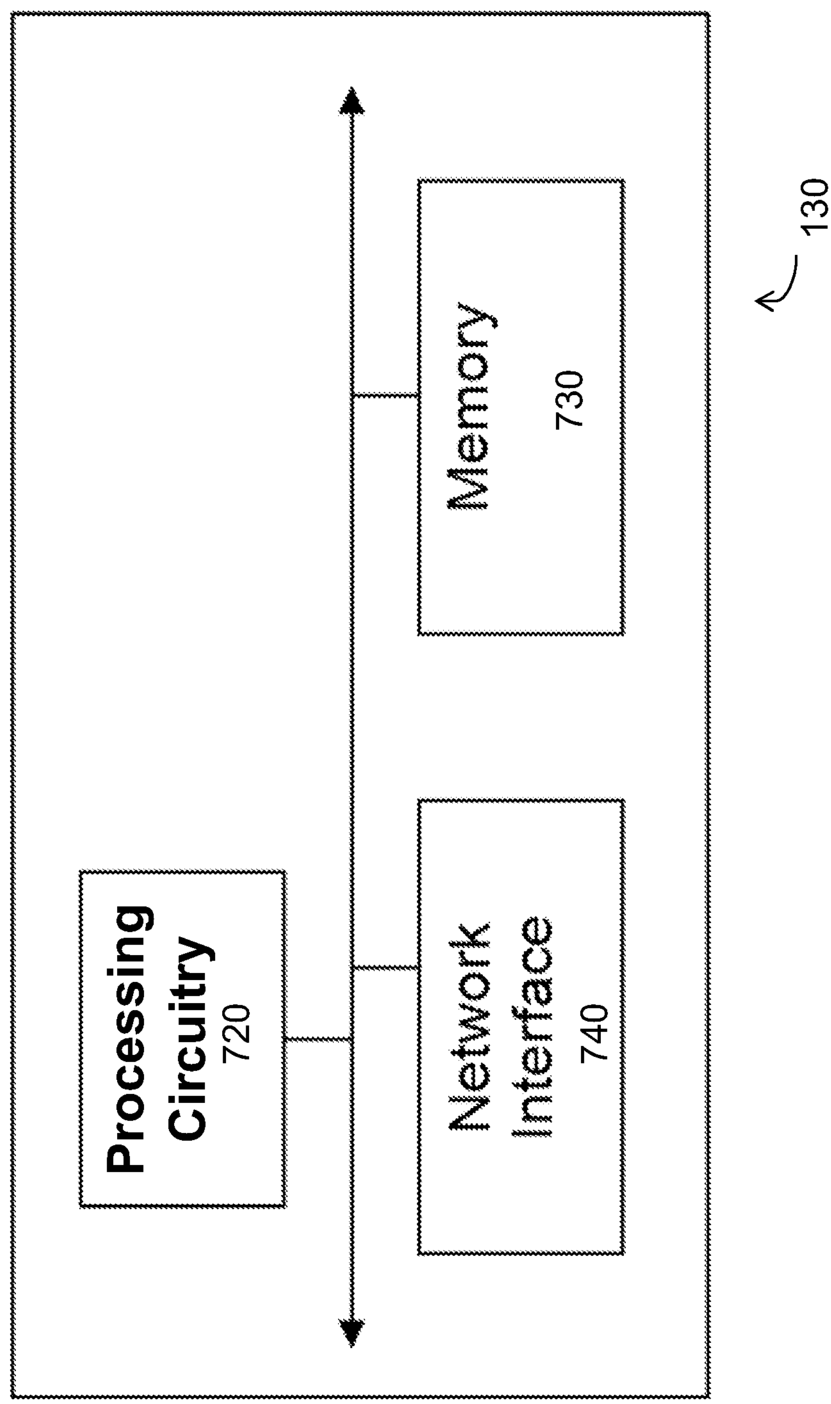
FIG. 7 is a block schematic of an exemplary radio network controller or core network node, in accordance with certain embodiments.

FIG. 7 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 720, memory 730, and network interface 740. In some embodiments, processing circuitry 720 executes instructions to provide some or all of the functionality described herein as being provided by the network node, memory 730 stores the instructions executed by processing circuitry 720, and network interface 740 communicates signals to any suitable node, such as a gateway, switch, router, Internet, Public Switched Telephone Network (PSTN), network nodes 115, radio network controllers or core network nodes 130, etc.

Processing circuitry 720 may include any suitable combination of hardware and software implemented in one or more modules to execute instructions and manipulate data to perform some or all of the described functions of the radio network controller or core network node 130. In some embodiments, processing circuitry 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by processing circuitry 720. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processing circuitry 720 and may refer to any suitable device operable to receive input for the network node, send output from the network node, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of the network node may include additional components beyond those shown in FIG. 7 that may be responsible for providing certain aspects of the network node's functionality, including any of the functionality described herein and/or any additional functionality (including any functionality necessary to support the solution described herein).

Figure 8:
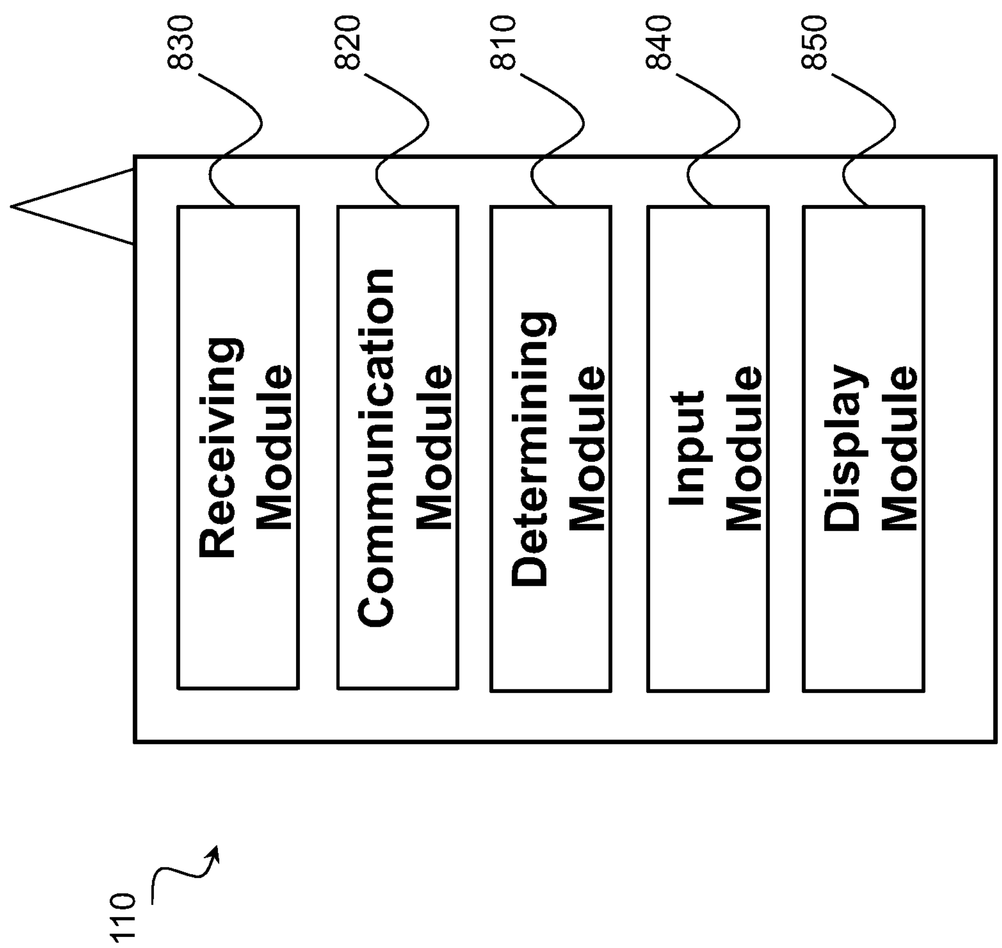
FIG. 8 is a block schematic of an exemplary wireless device, in accordance with certain embodiments.

FIG. 8 is a schematic block diagram of an exemplary wireless device, in accordance with certain embodiments. Wireless device 110 may include one or more modules. For example, wireless device 110 may include a determining module 810, a communication module 820, a receiving module 830, an input module 840, a display module 850, and any other suitable modules. In some embodiments, one or more of determining module 810, communication module 820, receiving module 830, input module 840, display module 850, or any other suitable module may be implemented using one or more processors, such as processing circuitry 520 described above in relation to FIG. 5. In certain embodiments, the functions of two or more of the various modules may be combined into a single module. Wireless device 110 may perform the methods for pre-emption indication message described in relation to any of FIGS. 1-4 and/or 10-13.

Determining module 810 may perform the processing functions of wireless device 110. For example, determining module 810 may perform one or more operations based on the received information associated with the pre-emption. As another example, determining module 810 may determine a corrupted or preempted region of a soft buffer based on the received information associated with the pre-emption. As still another example, determining module 810 may separately handle a portion of a soft buffer based on the received information associated with the pre-emption. As yet another example, determining module 810 may flush a portion of a soft buffer based on the received information associated with the pre-emption.

Determining module 810 may include or be included in one or more processors, such as processing circuitry 520 described above in relation to FIG. 5. Determining module 810 may include analog and/or digital circuitry configured to perform any of the functions of determining module 810 and/or processing circuitry 520 described above. The functions of determining module 810 described above may, in certain embodiments, be performed in one or more distinct modules.

Communication module 820 may perform the transmission functions of wireless device 110. Communication module 820 may include a transmitter and/or a transceiver, such as transceiver 510 described above in relation to FIG. 5. Communication module 820 may include circuitry configured to wirelessly transmit messages and/or signals. In particular embodiments, communication module 820 may receive messages and/or signals for transmission from determining module 810. In certain embodiments, the functions of communication module 820 described above may be performed in one or more distinct modules.

Receiving module 830 may perform the receiving functions of wireless device 110. For example, receiving module 830 may receive, from a network node, a pre-emption information message comprising information associated with pre-emption. Receiving module 830 may include a receiver and/or a transceiver. Receiving module 830 may include a receiver and/or a transceiver, such as transceiver 510 described above in relation to FIG. 5. Receiving module 830 may include circuitry configured to wirelessly receive messages and/or signals. In particular embodiments, receiving module 830 may communicate received messages and/or signals to determining module 810. The functions of receiving module 830 described above may, in certain embodiments, be performed in one or more distinct modules.

Input module 840 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 810. The functions of input module 840 described above may, in certain embodiments, be performed in one or more distinct modules.

Display module 850 may present signals on a display of wireless device 110. Display module 850 may include the display and/or any appropriate circuitry and hardware configured to present signals on the display. Display module 850 may receive signals to present on the display from determining module 810. The functions of display module 850 described above may, in certain embodiments, be performed in one or more distinct modules.

Determining module 810, communication module 820, receiving module 830, input module 840, and display module 850 may include any suitable configuration of hardware and/or software. Wireless device 110 may include additional modules beyond those shown in FIG. 8 that may be responsible for providing any suitable functionality, including any of the functionality described herein and/or any additional functionality (including any functionality necessary to support the various solutions described herein).

Figure 9:
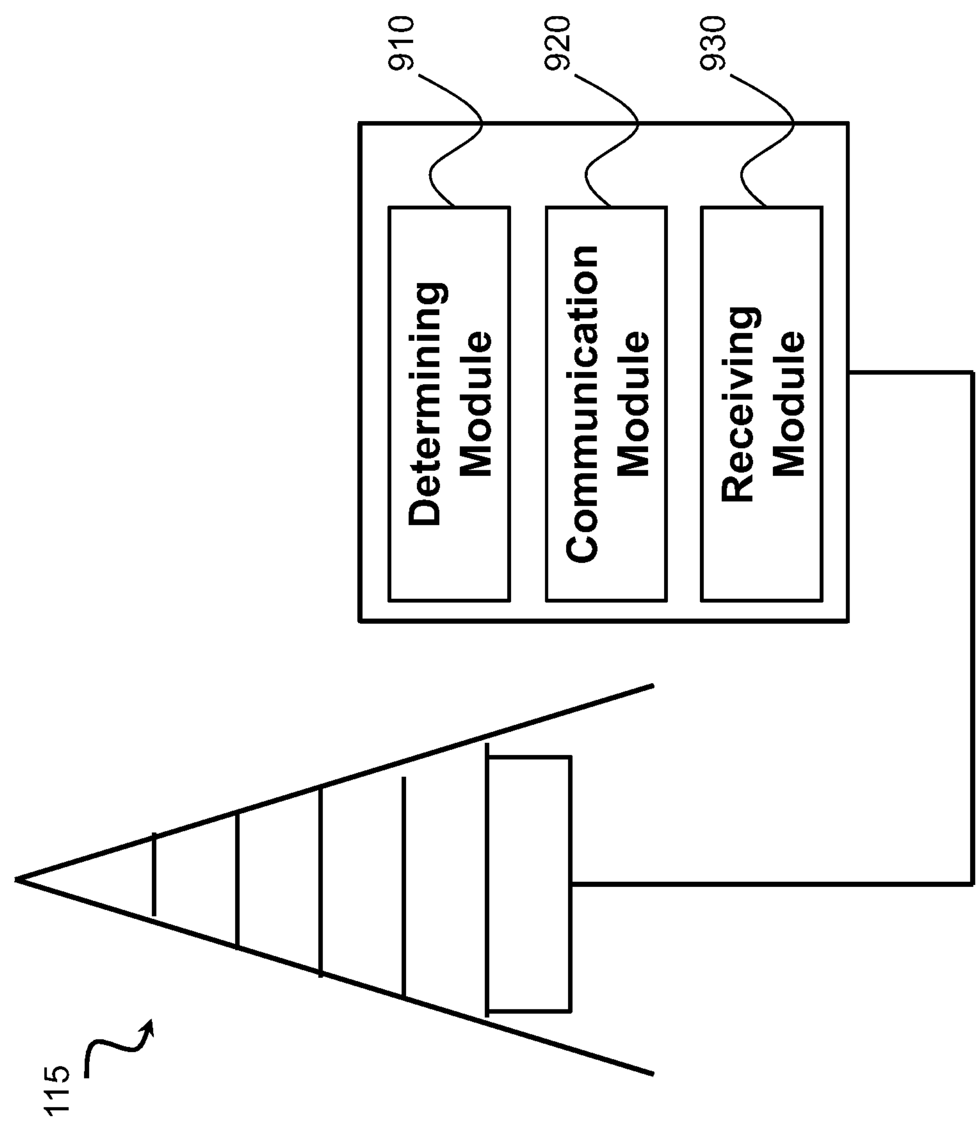
FIG. 9 is a block schematic of an exemplary network node, in accordance with certain embodiments.

FIG. 9 is a schematic block diagram of an exemplary network node 115, in accordance with certain embodiments. Network node 115 may include one or more modules. For example, network node 115 may include determining module 910, communication module 920, receiving module 930, and any other suitable modules. In some embodiments, one or more of determining module 910, communication module 920, receiving module 930, or any other suitable module may be implemented using one or more processors, such as processing circuitry 620 described above in relation to FIG. 6. In certain embodiments, the functions of two or more of the various modules may be combined into a single module. Network node 115 may perform the methods for pre-emption indication message described with respect to any of FIGS. 1-4 and/or 10-13.

Determining module 910 may perform the processing functions of network node 115. As an example, determining module 910 may determine that one or more wireless devices have been affected by pre-emption. Determining module 910 may include or be included in one or more processors, such as processing circuitry 620 described above in relation to FIG. 6. Determining module 910 may include analog and/or digital circuitry configured to perform any of the functions of determining module 910 and/or processing circuitry 620 described above. The functions of determining module 910 may, in certain embodiments, be performed in one or more distinct modules.

Communication module 920 may perform the transmission functions of network node 115. As one example, communication module 920 may send, to the one or more wireless devices, a pre-emption information message comprising information associated with the pre-emption. Communication module 920 may transmit messages to one or more of wireless devices 110. Communication module 920 may include a transmitter and/or a transceiver, such as transceiver 610 described above in relation to FIG. 6. Communication module 920 may include circuitry configured to wirelessly transmit messages and/or signals. In particular embodiments, communication module 920 may receive messages and/or signals for transmission from determining module 910 or any other module. The functions of communication module 920 may, in certain embodiments, be performed in one or more distinct modules.

Receiving module 930 may perform the receiving functions of network node 115. Receiving module 930 may receive any suitable information from a wireless device. Receiving module 930 may include a receiver and/or a transceiver, such as transceiver 610 described above in relation to FIG. 6. Receiving module 930 may include circuitry configured to wirelessly receive messages and/or signals. In particular embodiments, receiving module 930 may communicate received messages and/or signals to determining module 910 or any other suitable module. The functions of receiving module 930 may, in certain embodiments, be performed in one or more distinct modules.

Determining module 910, communication module 920, and receiving module 930 may include any suitable configuration of hardware and/or software. Network node 115 may include additional modules beyond those shown in FIG. 9 that may be responsible for providing any suitable functionality, including any of the functionality described herein and/or any additional functionality (including any functionality necessary to support the various solutions described herein).

Figure 10:
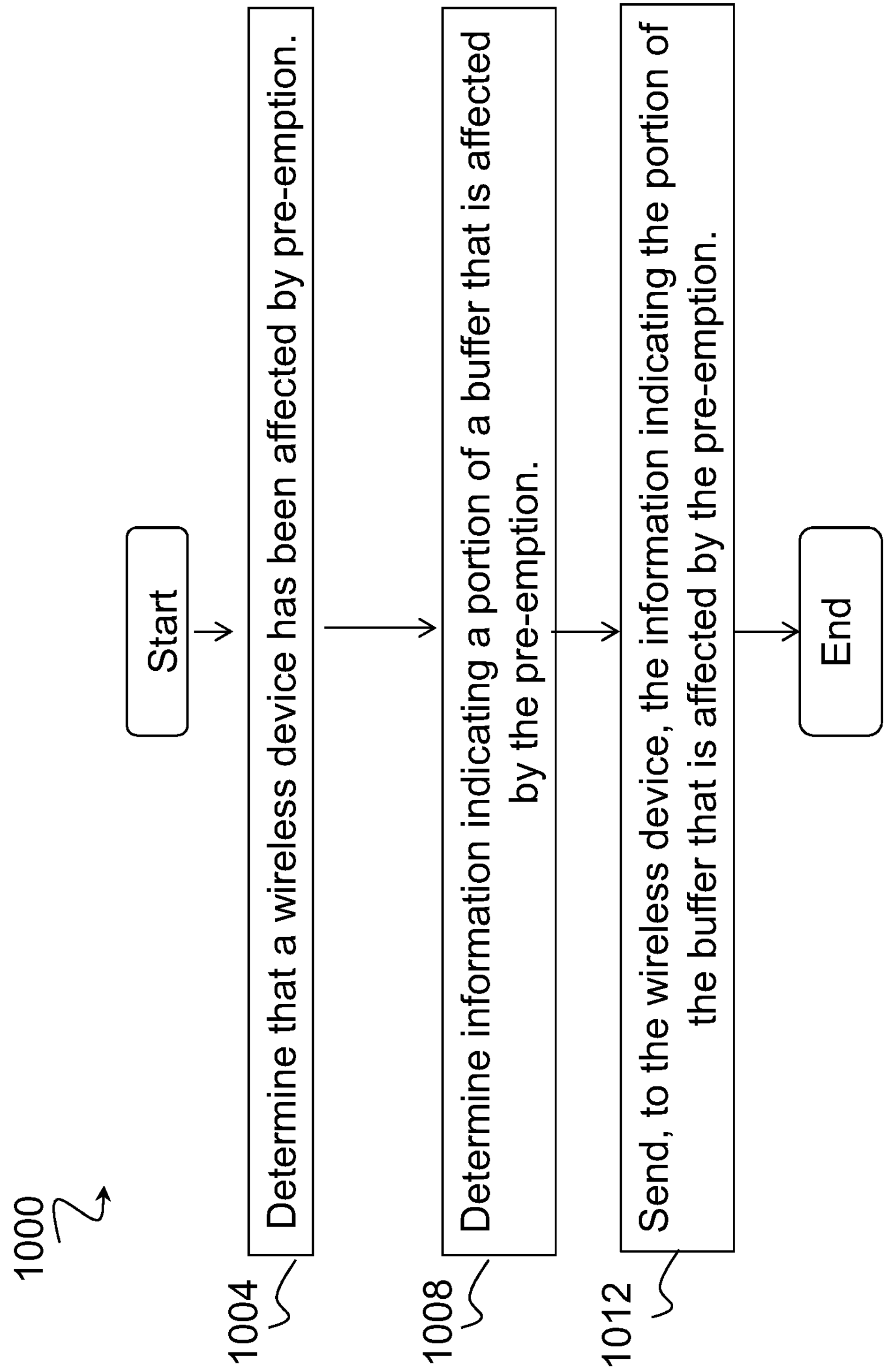
FIG. 10 is a flow diagram of a method in a network node, in accordance with certain embodiments.

FIG. 10 illustrates an example of a method for use in a network node 115. At step 1004, network node 115 determines that a wireless device 110 has been affected by pre-emption. For example, wireless device 110 may be affected by pre-emption if network node 115 allocates resources for the transmission to wireless device 110 and later overrides the allocation of resources such that the resources are re-allocated for a transmission to another wireless device.

At step 1008, the method comprises determining information that indicates a portion of wireless device 110's buffer that is affected by pre-emption. For example, the method may determine the resource allocation that was overridden by the pre-emption (e.g., based on information obtained from a scheduler within network node 115) and may prepare the information that indicates a portion of wireless device 110's buffer that is affected by pre-emption based on the resource allocation that was overridden by the pre-emption.

The information indicating the portion of the buffer that is affected by pre-emption may indicate one or more TRPs affected by pre-emption, one or more carriers affected by pre-emption, one or more frequency resources affected by pre-emption, and/or one or more time domain resources affected by pre-emption.

The portion of the buffer that is affected by pre-emption may be indicated using any suitable information. In certain embodiments, the information indicating the portion of the buffer that is affected by pre-emption comprises a bitfield for which each bit in the bitfield indicates whether a corresponding OFDM symbol previously received by wireless device 110 has been pre-empted. In certain embodiments, the number of bits in the bitfield consists of the number of OFDM symbols configured per subframe. In certain embodiments, the number of bits in the bitfield consists of 14 bits.

In certain embodiments, the information indicating the portion of the buffer that is affected by pre-emption indicates a subframe or slot number when pre-emption took place. The subframe or slot number can be configured to point backwards in time from when wireless device 110 is to receive the information indicating the portion of the buffer affected by pre-emption. For example, the information indicating the portion of the buffer that is affected by pre-emption may comprise a bitfield that indicates backward in time which subframe or slot was pre-empted. In one embodiment, the bitfield consists of 3 bits with the values (0, −1, −2, −3, −4, −5, −6, −7).

In certain embodiments, the information indicating the portion of the buffer that is affected by pre-emption comprises a time pointer that points backwards in time from when the information indicating the portion of the buffer is to be received by wireless device 110. As an example, the time pointer may indicate that the previous X milliseconds are affected by pre-emption.

In certain embodiments, the information indicating the portion of the buffer that is affected by pre-emption indicates a HARQ process number/identifier affected by pre-emption or a redundancy version of a HARQ retransmission affected by pre-emption.

In certain embodiments, the information indicating the portion of the buffer that is affected by pre-emption comprises an ACK/NACK resource indicator (ARI) and TPC for PUCCH. Providing this information may help wireless device 110 to repair the pre-empted message.

At step 1012, the method comprises sending wireless device 110 the information indicating the portion of the buffer that is affected by the pre-emption that was determined in step 1008. In certain embodiments, the information indicating the portion of the buffer that is affected by pre-emption is sent in DCI from network node 115 to wireless device 110. For example, the information may be sent in a DCI message communicated from the network node 115 via a Physical Downlink Control Channel (PDCCH). In certain embodiments, the information indicating the portion of the buffer that is affected by pre-emption is configured by RRC.

In certain embodiments, the method described in FIG. 10 may be performed by network node 115 illustrated in FIG. 6. For example, processing circuitry 620 can be configured to determine that a wireless device 110 has been affected by pre-emption (step 1004) and determine information indicating a portion of a buffer that is affected by the pre-emption (step 1008). An interface, such as transceiver 610 can be configured to send the information to the wireless device (step 1012). In certain embodiments, the method described in FIG. 10 may be performed by network node 115 illustrated in FIG. 9. For example, determining module 910 can be configured to determine that a wireless device 110 has been affected by pre-emption (step 1004) and determine information indicating a portion of a buffer that is affected by the pre-emption (step 1008). Communication module 920 can be configured to send the information to the wireless device (step 1012).

Figure 11:
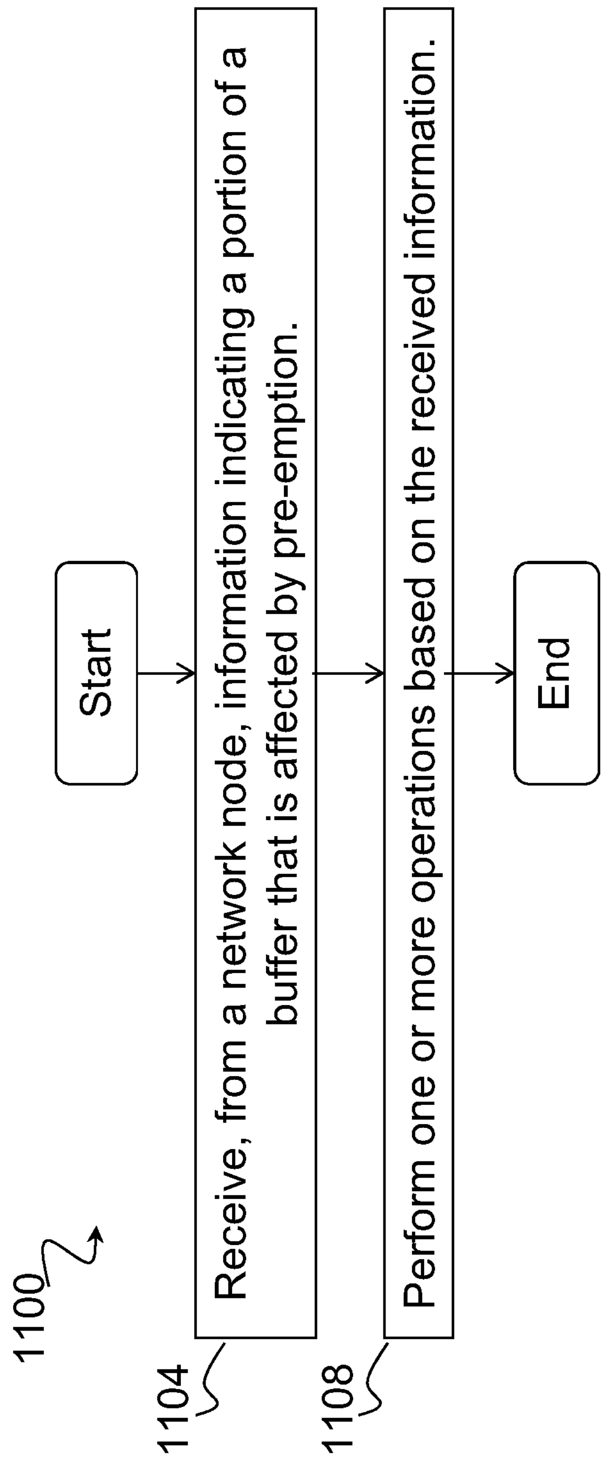
FIGS. 11-13 are flow diagrams, each illustrating a method in a wireless device, in accordance with certain embodiments.

FIG. 11 illustrates an example of a method for use in a wireless device 110 affected by pre-emption. For example, wireless device 110 may be affected by pre-emption if network node 115 allocates resources for a transmission to wireless device 110 and later overrides the allocation of resources such that the resources are re-allocated for a transmission to another wireless device. The pre-emption can affect a buffer maintained by wireless device 110.

At step 1104, the method comprises receiving information from a network node 115. The information indicates a portion of wireless device 110's buffer that is affected by pre-emption. For example, the information indicating the portion of the buffer that is affected by pre-emption may indicate one or more TRPs affected by pre-emption, one or more carriers affected by pre-emption, one or more frequency resources affected by pre-emption, and/or one or more time domain resources affected by pre-emption. In certain embodiments, the information indicating the portion of the buffer that is affected by pre-emption is received in DCI from the network node 115. For example, the information may be received in a DCI message communicated from the network node 115 via a Physical Downlink Control Channel (PDCCH). In certain embodiments, the information indicating the portion of the buffer that is affected by pre-emption is configured by RRC.

The portion of the buffer that is affected by pre-emption may be indicated using any suitable information. In certain embodiments, the information indicating the portion of the buffer that is affected by pre-emption comprises a bitfield for which each bit in the bitfield indicates whether a corresponding, previously received OFDM symbol has been pre-empted. In certain embodiments, the number of bits in the bitfield consists of the number of OFDM symbols configured per subframe. In certain embodiments, the number of bits in the bitfield consists of 14 bits. As an example, suppose wireless device 110 receives a bitfield, such as 00000000001111. In certain embodiments, the example bitfield indicates that previously received OFDM symbols 0-9 are not affected by pre-emption and previously received OFDM symbols 10-13 are affected by pre-emption (or vice versa, depending on the embodiment).

In certain embodiments, the information indicating the portion of the buffer that is affected by pre-emption indicates a subframe or slot number when pre-emption took place. The subframe or slot number can point backwards in time from when wireless device 110 receives the information indicating the portion of the buffer affected by pre-emption. For example, the information indicating the portion of the buffer that is affected by pre-emption may comprise a bitfield that indicates backward in time which subframe or slot was pre-empted. In one embodiment, the bitfield consists of 3 bits with the values (0, −1, −2, −3, −4, −5, −6, −7).

In certain embodiments, the information indicating the portion of the buffer that is affected by pre-emption comprises a time pointer that points backwards in time from when the information indicating the portion of the buffer is received. As an example, the time pointer may indicate that the previous X milliseconds are affected by pre-emption.

In certain embodiments, the information indicating the portion of the buffer that is affected by pre-emption indicates a HARQ process number/identifier that was affected by pre-emption or a redundancy version of a HARQ retransmission affected by pre-emption.

In certain embodiments, the information indicating the portion of the buffer that is affected by pre-emption comprises an ACK/NACK resource indicator (ARI) and TPC for PUCCH. Providing this information may help wireless device 110 to repair the pre-empted message. After the pre-empted message has been repaired, wireless device can indicate an ACK to network node 115.

At step 1108, the method comprises performing one or more operations based on the received information. Examples of operations include determining a corrupted or preempted region of wireless device 110's buffer based on the received information, flushing the portion of the buffer affected by pre-emption (an example of which is illustrated in FIG. 12), and/or separately handling the portion of the buffer affected by pre-emption (an example of which is illustrated in FIG. 13).

In certain embodiments, the method described in FIG. 11 may be performed by wireless device 110 illustrated in FIG. 5. For example, an interface, such as transceiver 510, can be configured to receive information indicating a portion of a buffer that is affected by pre-emption (step 1104). Processing circuitry 520 can be configured to perform one or more operations based on the received information (step 1108). In certain embodiments, the method described in FIG. 11 may be performed by wireless device 110 illustrated in FIG. 8. For example, receiving module 830 can be configured to receive information indicating a portion of a buffer that is affected by pre-emption (step 1104). Determining module 810 can be configured to perform one or more operations based on the received information (step 1108).

Figure 12:
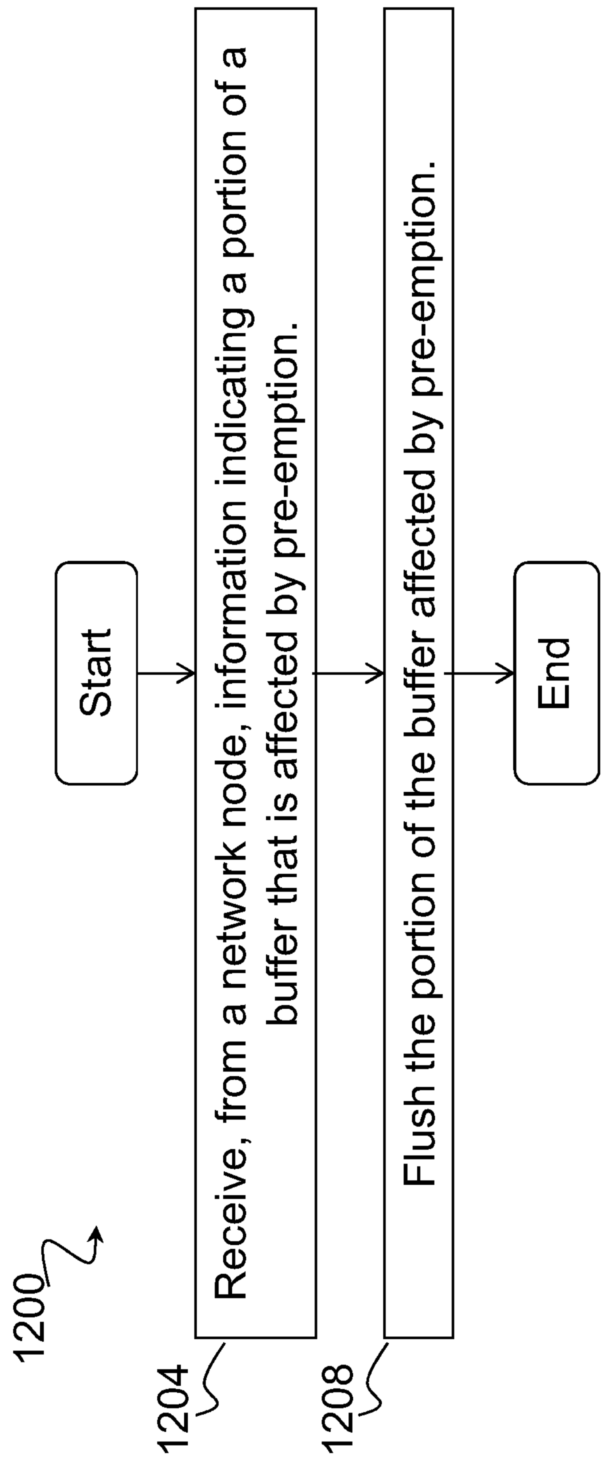

FIG. 12 illustrates an example of a method for use in a wireless device 110 affected by pre-emption. Step 1204 is analogous to step 1104 discussed with respect to FIG. 11 in which wireless device 110 receives information indicating a portion of a buffer that is affected by pre-emption from network node 115. At step 1208, wireless device 110 performs one or more operations based on the received information. In particular, at step 1208, the one or more operations comprise flushing the portion of the buffer affected by pre-emption.

Figure 13:
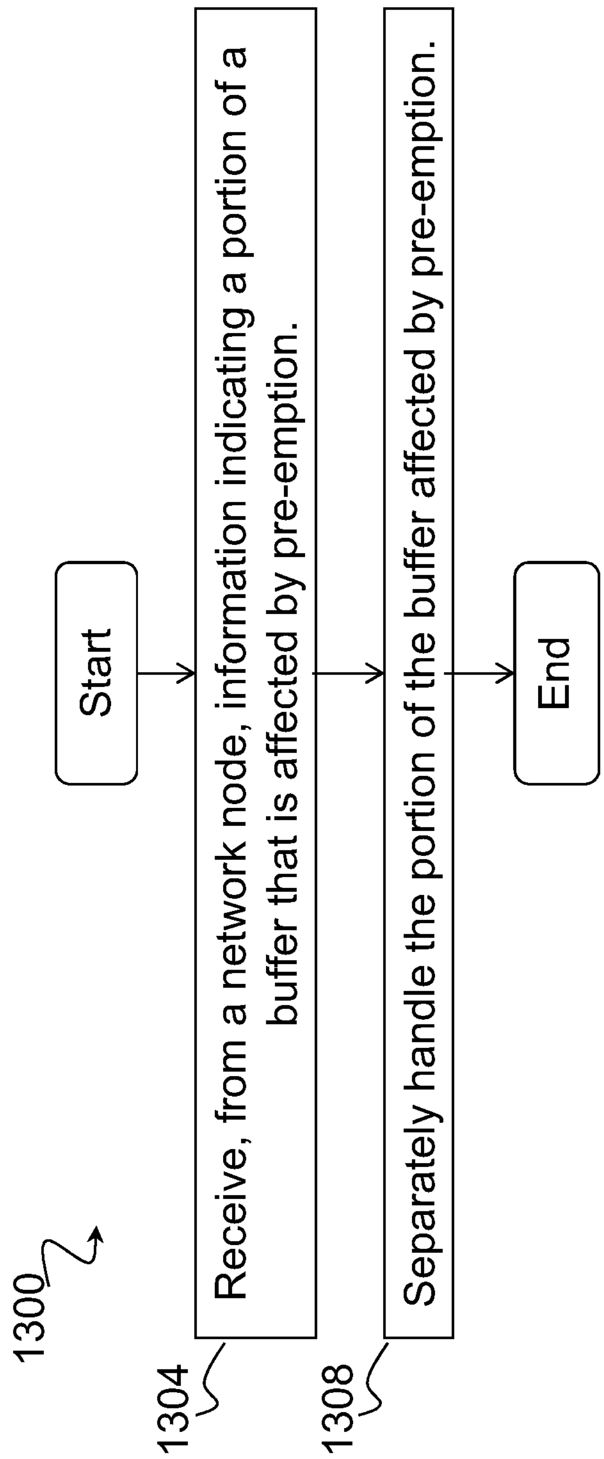

FIG. 13 illustrates an example of a method for use in a wireless device 110 affected by pre-emption. Step 1304 is analogous to step 1104 discussed with respect to FIG. 11 in which wireless device 110 receives information indicating a portion of a buffer that is affected by pre-emption from network node 115. At step 1308, wireless device 110 performs one or more operations based on the received information. In particular, at step 1308, the one or more operations comprise separately handling the portion of the buffer affected by pre-emption. For example, this separately handling the portion of the buffer affected by pre-emption can include moving the indicated part of the buffer to a separate portion of the buffer (or to a separate buffer). In certain embodiments, separately handling the portion of the buffer affected by pre-emption can include repairing the pre-empted message.

SUMMARY OF EXAMPLE EMBODIMENTS

According to one example embodiment, a method in a network node is disclosed. The method comprises determining that one or more wireless devices have been affected by pre-emption. The method comprises sending, to the one or more wireless devices, a pre-emption information message comprising information associated with the pre-emption. In certain embodiments, one or more of the following may apply:

- the pre-emption may affect a slot transmission from the network node to the wireless device;
- the one or more wireless devices may be affected by pre-emption;
- the pre-emption information message may be comprised in downlink control information (DCI);
- the pre-emption information message may be wireless device specific;
- the information associated with the pre-emption may comprise information indicating one or more pre-empted physical resources;
- the information associated with the pre-emption may comprise information that identifies a pre-empted region of a soft buffer;
- the information associated with the pre-emption may comprise one or more of:
  - Subframe/slot number, when pre-emption took place;
  - Time pointer, such as a time pointer that points backwards in time from when the pre-emption DCI is received;
  - HARQ process number/ID, which was affected by pre-emption;
  - Carrier indicator and TRP indicator;
  - A time domain indication for the slot that is pre-empted, in which the affected OFDM symbols are indicated;
  - Frequency domain resource, where pre-emption took place;
  - Redundancy Version (RV); and
  - ARI indicator and TPC for Physical Uplink Control Channel (PUCCH).
- the pre-emption information message may comprise a bitfield that indicates backward in time which slot was pre-empted;
  - the bitfield may have 3 bits with the values (0, −1, −2, −3, −4, −5, −6, −7);
- the pre-emption information message may comprise a bitfield that indicates which OFDM symbols were pre-empted in an affected slot;
  - the bitfield may have 14 bits, and each bit may indicate the correspondingly pre-empted OFDM symbol; and
- the pre-emption information message may reuse a DCI payload size that the wireless device is monitoring for one or more other purposes.

According to another example embodiment, a network node is disclosed. The network node comprises processing circuitry. The processing circuitry is configured to determine that one or more wireless devices have been affected by pre-emption. The processing circuitry is configured to send, to the one or more wireless devices, a pre-emption information message comprising information associated with the pre-emption.

According to another example embodiment, a method in a wireless device is disclosed. The method comprises receiving, from a network node, a pre-emption information message comprising information associated with pre-emption. The method comprises performing one or more operations based on the received information associated with the pre-emption. In certain embodiments, one or more of the following may apply:

- the pre-emption may affect a slot transmission from the network node to the wireless device;
- the wireless device may be affected by pre-emption;
- the pre-emption information message may be comprised DCI;
- performing one or more operations based on the received information associated with the pre-emption may comprise one or more of:
  - determining a corrupted or preempted region of a soft buffer based on the received information associated with the pre-emption;
  - separately handling a portion of a soft buffer based on the received information associated with the pre-emption; and
  - flushing a portion of a soft buffer based on the received information associated with the pre-emption;
- the pre-emption information message may be specific to the wireless device;
- the information associated with the pre-emption may comprise information indicating one or more pre-empted physical resources;
- the information associated with the pre-emption may comprise information that identifies a pre-empted region of a soft buffer;
- the information associated with the pre-emption may comprise one or more of:
  - Subframe/slot number, when pre-emption took place;
  - Time pointer, such as a time pointer that points backwards in time from when the pre-emption DCI is received;
  - HARQ process number/ID, which was affected by pre-emption;
  - Carrier indicator and TRP indicator;
  - A time domain indication for the slot that is pre-empted, in which the affected OFDM symbols are indicated;
  - Frequency domain resource, where pre-emption took place;
  - RV; and
  - ARI indicator and TPC for PUCCH;
- the pre-emption information message may comprise a bitfield that indicates backward in time which slot was pre-empted;
  - the bitfield may have 3 bits with the values (0, −1, −2, −3, −4, −5, −6, −7);
- the pre-emption information message may comprise a bitfield that indicates which OFDM symbols were pre-empted in an affected slot;
  - the bitfield may have 14 bits, and each bit may indicate the correspondingly pre-empted OFDM symbol; and
- the pre-emption information message may reuse a DCI payload size that the wireless device is monitoring for one or more other purposes.

According to another example embodiment, a wireless device is disclosed. The wireless device comprises processing circuitry. The processing circuitry is configured to receive, from a network node, a pre-emption information message comprising information associated with pre-emption. The processing circuitry is configured to perform one or more operations based on the received information associated with the pre-emption.

Certain embodiments of the present disclosure may provide one or more technical advantages. As one example, certain embodiments may make it possible to send sufficient information to a UE about which part of the soft-buffer should be handled separately or flushed in case of slot transmission pre-emption. Other advantages may be readily apparent to one having skill in the art. Certain embodiments may have none, some, or all of the recited advantages.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method for use in a wireless device affected by pre-emption, the method comprising:

receiving, from a network node, information indicating that a transmission is affected by pre-emption, wherein the information indicating that the transmission is affected by pre-emption indicates two or more carriers affected by pre-emption, wherein the information indicating that the transmission is affected by pre-emption comprises a bitfield, each bit indicating whether a corresponding Orthogonal Frequency-Division Multiplexing (OFDM) symbol has been pre-empted; and performing one or more operations based on the received information.

2. The method of claim 1, wherein the one or more operations comprise:

flushing a portion of a buffer where the transmission affected by pre-emption is buffered.

3. The method of claim 1, wherein the one or more operations comprise:

separately handling a portion of a buffer where the transmission affected by pre-emption is buffered.

4. The method of claim 1, wherein the information indicating that the transmission is affected by pre-emption is received in Downlink Control Information (DCI) from the network node.

5. The method of claim 1, wherein the information indicating that the transmission is affected by pre-emption indicates one or more frequency resources affected by pre-emption.

6. A wireless device, comprising:

an interface configured to receive, from a network node, information indicating that a transmission is affected by pre-emption, wherein the information indicating that the transmission is affected by pre-emption indicates two or more carriers affected by pre-emption, wherein the information indicating that the transmission is affected by pre-emption comprises a bitfield, each bit indicating whether a corresponding Orthogonal Frequency-Division Multiplexing (OFDM) symbol has been pre-empted; and processing circuitry configured to perform one or more operations based on the received information.

7. The wireless device of claim 6, wherein the one or more operations comprise:

flushing a portion of a buffer where the transmission affected by pre-emption is buffered.

8. The wireless device of claim 6, wherein the one or more operations comprise:

separately handling a portion of a buffer where the transmission affected by pre-emption is buffered.

9. The wireless device of claim 6, wherein the information indicating that the transmission is affected by pre-emption is received in Downlink Control Information (DCI) from the network node.

10. The wireless device claim 6, wherein the information indicating that the transmission is affected by pre-emption indicates one or more frequency resources affected by pre-emption.

11. A method for use in a network node, the method comprising:

determining that a wireless device has been affected by pre-emption; and sending, to the wireless device, information indicating that a transmission is affected by the pre-emption, wherein the information indicating that the transmission is affected by pre-emption indicates two or more carriers affected by pre-emption, wherein the information indicating that the transmission is affected by pre-emption comprises a bitfield, each bit indicating whether a corresponding Orthogonal Frequency-Division Multiplexing (OFDM) symbol has been pre-empted.

12. The method of claim 11, wherein the information indicating that the transmission is affected by pre-emption is sent in Downlink Control Information (DCI) from the network node.

13. The method of claim 11, wherein the information indicating that the transmission is affected by pre-emption indicates one or more frequency resources affected by pre-emption.

14. A network node, comprising:

processing circuitry configured to determine that a wireless device has been affected by pre-emption; and an interface configured to send, to the wireless device, information indicating that a transmission is affected by the pre-emption, wherein the information indicating that the transmission is affected by pre-emption indicates two or more carriers affected by pre-emption, wherein the information indicating that the transmission is affected by pre-emption comprises a bitfield, each bit indicating whether a corresponding Orthogonal Frequency-Division Multiplexing (OFDM) symbol has been pre-empted.

15. The network node of claim 14, wherein the information indicating that the transmission is affected by pre-emption is sent in Downlink Control Information (DCI) from the network node.

16. The network node of claim 14, wherein the information indicating that the transmission is affected by pre-emption indicates one or more frequency resources affected by pre-emption.

17. The network node of claim 14, wherein the information indicating that the transmission is affected by pre-emption is configured by Radio Resource Control (RRC).

18. The network node of claim 14, wherein the information indicating that the transmission is affected by pre-emption comprises a time pointer that points backwards in time from when the information indicating that the transmission is affected by pre-emption is received.

19. The method of claim 1, wherein the information indicating that the transmission is affected by pre-emption is configured by Radio Resource Control (RRC).

20. The method of claim 1, wherein the information indicating that the transmission is affected by pre-emption comprises a time pointer that points backwards in time from when the information indicating that the transmission is affected by pre-emption is received.

21. The wireless device of claim 6, wherein the information indicating that the transmission is affected by pre-emption is configured by Radio Resource Control (RRC).

22. The wireless device of claim 6, wherein the information indicating that the transmission is affected by pre-emption comprises a time pointer that points backwards in time from when the information indicating that the transmission is affected by pre-emption is received.

23. The method of claim 11, wherein the information indicating that the transmission is affected by pre-emption is configured by Radio Resource Control (RRC).

24. The method of claim 11, wherein the information indicating that the transmission is affected by pre-emption comprises a time pointer that points backwards in time from when the information indicating that the transmission is affected by pre-emption is received.

* * * * *